(12) United States Patent
Steele et al.

(10) Patent No.: US 9,926,418 B2
(45) Date of Patent: *Mar. 27, 2018

(54) CURATIVE FIBRE COMPONENTS

(75) Inventors: Mark Raymond Steele, Belper (GB); Andrew Gibbs, Tibshelf (GB); Amy Grace Atinkson, Sherwood (GB)

(73) Assignee: CYTEC INDUSTRIAL MATERIALS (DERBY) LIMITED, Heanor (GB)

( * ) Notice: Subject to any disclaimer, the term of this patent is extended or adjusted under 35 U.S.C. 154(b) by 109 days.

This patent is subject to a terminal disclaimer.

(21) Appl. No.: 13/140,055

(22) PCT Filed: Nov. 24, 2009

(86) PCT No.: PCT/GB2009/002729
§ 371 (c)(1),
(2), (4) Date: Jul. 26, 2011

(87) PCT Pub. No.: WO2010/072990
PCT Pub. Date: Jul. 1, 2010

(65) Prior Publication Data
US 2011/0274907 A1 Nov. 10, 2011

(30) Foreign Application Priority Data

Dec. 23, 2008 (GB) .................................. 0823403.1
Oct. 2, 2009 (GB) .................................. 0917263.6

(51) Int. Cl.
*D01F 1/00* (2006.01)
*C08J 5/24* (2006.01)
*C08J 5/04* (2006.01)

(52) U.S. Cl.
CPC . *C08J 5/24* (2013.01); *C08J 5/04* (2013.01); *Y10T 428/24994* (2015.04)

(58) Field of Classification Search
CPC ..... D01F 1/02; D01F 1/10; D01F 1/00; D01F 1/106
(Continued)

(56) References Cited

U.S. PATENT DOCUMENTS 3,746,669 A * 7/1973 Dunnom et al. .............. 524/493
4,542,190 A * 9/1985 Kitahara ................. C08C 19/40
525/192
(Continued)

FOREIGN PATENT DOCUMENTS

CN 1490150 A 4/2004
EP 0623644 11/1994
(Continued)

OTHER PUBLICATIONS

WiseGeek, "What is a curing agent", copyright 2003-2014.*
(Continued)

*Primary Examiner* — Camie S Thompson
(74) *Attorney, Agent, or Firm* — Thi Dang

(57) ABSTRACT

Curative fibre components comprise one or more fibres for filaments of curative suitable to cure curable resins such as thermoset resin. In curative fibre components comprising a plurality of fibres of curative, the fibres can be commingled, such as twisting, to form a thread or yarn. Curative fibre components can be used to form a material in the form of a sheet, fabric, layer, textile or mat of woven or non-woven curative fibres. Curative fibre components can be used to produce composite materials such as fibre reinforced resinous composite materials. The curative fibre components can be commingled, including interwoven, stitched and layered with other fibres or fibrous materials, such as fibrous reinforcement, fibrous curable resin, fibrous thermoplastic, other non-reinforcing fibres to form composite materials, prepregs, preforms and articles.

5 Claims, 14 Drawing Sheets

(58) Field of Classification Search
USPC .............................. 428/364, 370, 392, 292.1
See application file for complete search history.

(56) References Cited

U.S. PATENT DOCUMENTS

| | | | |
|---|---|---|---|
| 5,319,026 A * | 6/1994 | Hahn et al. | 525/192 |
| 8,084,126 B2 * | 12/2011 | Steele et al. | 428/364 |
| 2004/0052997 A1 | 3/2004 | Santo | |
| 2007/0100071 A1 * | 5/2007 | Bonnet et al. | 525/88 |

FOREIGN PATENT DOCUMENTS

| | | |
|---|---|---|
| EP | 2098561 A2 | 9/2009 |
| GB | 946343 | 1/1964 |
| GB | 972078 | 10/1964 |
| GB | 1087902 | 10/1967 |
| GB | 1087906 | 10/1967 |
| GB | 2451136 A | 1/2009 |
| JP | 62-1719 A | 1/1987 |
| JP | 63-17938 A | 1/1988 |
| JP | 9-227619 A | 9/1997 |
| JP | 2000-136292 A | 5/2000 |
| WO | 00/58083 A1 | 10/2000 |

OTHER PUBLICATIONS

Jeffrey Jansen, Comparing Thermoplastic Elastomers and Thermoset Rubbers, accessed online Dec. 20, 2016.*

Search Report issued by the United Kingdom Intellectual Property Office dated Jan. 28, 2010 in corresponding patent application No. GB0917263.6.

International Search Report and Written Opinion issued in PCT/GB2009/002729.

* cited by examiner

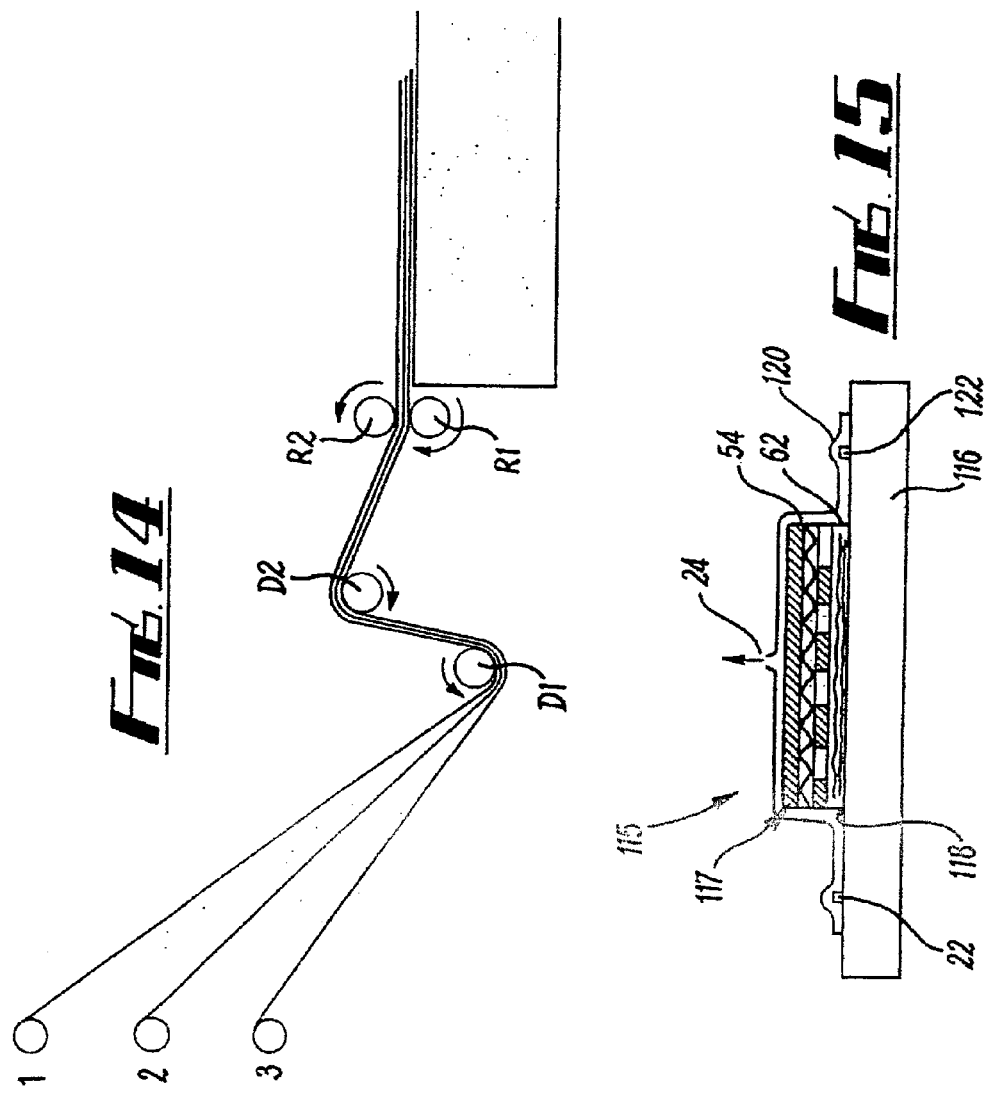

CURATIVE FIBRE COMPONENTS

The present invention relates to curative fibre components, particularly but not exclusively to curative fibre components for use in curing thermoset resins.

Thermoset resins are commonly used as a curable matrix or as a major component of a curable matrix in the production of fibre reinforced composites. The reinforcing fibres are generally insoluble within the resin matrix, generally acting to stiffen and strengthen and thus reinforce the resin matrix particularly once cured. Suitable such reinforcing fibres include carbon, glass, aramid, ceramic and others known to those skilled in the art.

The combined physical and chemical properties of the thermoset resin and the reinforcing fibres in composite materials are generally such that when the combination is cured, the resultant composite articles have considerable strength and relatively light weight characteristics which enable such components to find many applications in many industries, including the aerospace, automotive, marine and civil engineering industries. The resin(s) and fibre(s) are carefully chosen to produce a composite material and composite article with desired characteristics, as is well known to those skilled in the art.

There are many known methodologies for forming fibre reinforced composite materials and articles made from fibre reinforced composite materials. There are methods that involve the combination of matrix resin with reinforcing fibres prior to placement on a tool or in a mould for cure to form composite articles. Prepregs are pre-selected combinations of reinforcing fibre and matrix resin generally presented in the form of sheets or tapes. The advantages and disadvantages of known prepreg conformations are known to those skilled in the art.

Other methods for the manufacture of fibre reinforced composites include placement of dry reinforcing fibres into a tool or mould and then infusing resin into the fibres using technologies such as Resin Transfer Moulding and Liquid Resin Infusion.

Commonly used thermoset matrix resins include epoxy resin, cyanate ester, BMIs, benzoxazines or combinations thereof. In the manufacture of prepregs, the thermoset resins are generally introduced to a layer of reinforcing fibres to either fully impregnate or partially impregnate the layer, according to known techniques. The matrix resin can be introduced to the reinforcing fibre layer in liquid form to either form a layer of resin on the fibre, to partially impregnate or fully impregnate the fibre layer, or it can be introduced as a preformed layer of resin placed on the surface of the fibre layer. In such prepregs, the thermoset resin is often premixed with curative to facilitate cure of the thermoset. As a consequence, the shelf-life of such prepregs is limited, often with freezing or refrigeration storage required to prolong shelf-life to a practicable level.

In the resin infusion technologies, the thermoset matrix resin is generally introduced in liquid form to fully impregnate the dry fibre layers during cure. Again, the thermoset resin is generally introduced along with the curative premixed therein which often in combination with conditions of elevated temperature and/or pressure results in the cure of the thermoset resin within the reinforcing fibre structure and thus the formation of a composite component or article having a fibre reinforced resin matrix. However, to ensure complete and timely cure of the thermoset requires precise cure conditions to be applied for the particular thermoset resin and curative used in any given system. This can be time consuming and difficult to achieve. If the rate of infusion of the matrix resin is too slow then the thermoset resin and curative will react to a state where satisfactory impregnation cannot be achieved.

With such known technologies for the production of fibre reinforced composite articles it is the general aim to prevent or minimise the formation of undesirable air pockets or voids within the cured fibre reinforced composite article as these present weaknesses within the finished article. When uncured prepregs are placed in a mould or tool to form an article, it can be desirable for a number to be stacked on top of one another. Often air gets trapped between the layers and various technologies exist that assist in the removal of these air pockets during the cure process. However, these can involve complex and expensive processes and apparatus, such as autoclaves to produce the necessary conditions to drive the air out from between the resinous layers.

With the resin infusion technologies unwanted air can generally be avoided provided the rate and timing of infusion and cure are optimised, which can be difficult to achieve because the conditions to achieve this will vary from resin system to resin system, curative to curative, fibre to fibre, etc.

According to the present invention there is provided a curative fibre component comprising a curative for curing a curable resin.

The curative fibre component may comprise a single fibre of curative. Alternatively the curative fibre component may comprise a plurality of fibres of curative. The fibre(s) within the curative fibre component may be continuous and/or discontinuous, unidirectional, twisted and/or intertwined.

The curative fibre component preferably comprises one or more of catalyst and/or hardener and/or accelerator. The curative fibre component is preferably suitable to cure thermoset resin. Examples of suitable curatives include dicyanimide, 4,4'-diaminodiphenylsulphone, 3,3'-diaminodiphenylsulphone, 4,4'-methylenebis(2,6'-diethylaniline), 4,4'-methylenebis(2-isopropyl-6-methylaniline), 3,5'-diethyetoluene-2,4/2,6-diamine, 4,4-diaminodiphenylmethane, 1,3-diaminobenzene, 1,4-diaminobenzene, N,N'-(methyl-1,3-phenylene)bis[N,N'-dimethylurea], 1-(2-cyanoethyl)-2-ethyl-4-methylimidazole, 1-(2-cyanoethyl-2-methylimidazole, 2-ethyl-4-methylimidazole, 1-methylimidazole, other imidazole derivatives, boron trifluoride complexes, boron trichoiride complexes, bisphenol A, bisphenal F, thiodiphenol, phthalic anhydride, maleic anhydride, nadic anhydride, methylnadic anhydride, tetrahydrophthalic anhydride, hexahydrophthalic anhydride, methyltetrahydrophthalic anhydride, methylhexahydrophthalic anhydride, succinic anhydride, nonecenylsuccinic anhydride and dodecenylsuccinic anhydride. The or at least one of the fibres in the fibre component may comprise a blend of a number of curatives and/or the component may comprise a plurality of different fibres comprising different curatives and/or blends thereof.

The curative fibre component may comprise one or more additives, such as one or more thermoplastics and/or rubber, that may act to toughen the curable resin particularly when cured and/or may facilitate formation and retention of the curative in fibre form such as thermoplastic, rubber, nanoparticles such as carbon nano-tubes. The or at least one of the additives may be dissolved within the curative.

The curative in the curative fibre component may comprise only a part of a curative system needed to cure the resin it is intended to cure. The said part can be selected according to the desired properties of the curative fibre component and/or the products to be made therewith. One property of interest is the storage or shelf life of the curative fibre component and/or uncured material produced therewith. It is generally advantageous for the curative fibre component and uncured materials made therewith to have as long a shelf life as possible, and particularly to have good shelf life when stored under ambient temperatures (18° C. to 23° C.). Many curative systems for curing in particular thermoset resins comprise a number of parts or constituents, one or more of which can be more active than others at particular stages of cure. One or more parts may be relatively active (to promote resin cure) at early stages of cure, and one or more are more active at later stages. Curative systems are generally formulated by those skilled in the art to comprise parts or constituents that provide the desired cure characteristics for the resin(s) to be cured thereby. The curative may comprise a part of a curative system that is relatively active at an early stage of cure, particularly at intended storage conditions. The solid fibrous form of the curative fibre component has the effect of any interaction between the curative and any curable resin in the material being limited, and generally significantly less than would be the case were the curative in liquid form. This significant limitation in interaction endows materials of the present invention with good storage characteristics even in embodiments where the curable resin and curative fibre component are stored with the curable resin in liquid or resinous form impregnated on the material around the curative fibre component. In other embodiments where the contact between the curative fibre component and the curable resin is limited or non-existent, the storage characteristics will be further improved. For example, in embodiments where the curable resin is in liquid or resinous form but the curative fibre component is not completely embedded in the curable resin, the level of interaction will be further limited. In embodiments where the curable resin itself is provided in whole or in part in fibrous or other solid form, the interaction therebetween can be still further limited even if they are in contact, or substantially eliminated if they are provided in the material to be out of contact, giving such materials particularly good storage characteristics.

Alternatively, the curative may comprise a part that is relatively inactive at an early stage of cure, particularly at intended storage conditions. This can be advantageous to ensure that the curative fibre component will have sufficient time to melt and disperse thoroughly throughout the composite material during the cure cycle.

Preferably the curative fibre component has a viscosity greater than 50,000 Pa·s, more preferably, greater than 200,000 Pa·s, at a temperature of 23° C. Preferably the viscosity drops to below 20,000 Pa·s during cure.

The or at least some of the fibres of the curative fibre component may have a diameter of between 1 and 200 microns. Preferably the or at least some of the fibres of the curative fibre component have a diameter of between 10 and 100 microns and most preferably between 10 and 50 microns.

Preferably the curative fibre component has a shelf-life of over 12 months when stored frozen and preferably has a shelf-life of over 3 months if stored at ambient temperatures (between 18° C. and 23° C.).

According to a further aspect of the present invention there is provided a curative fibre material comprising a plurality of curative fibre components.

The material may comprise curative fibre components at least some of which are woven to form a fibrous curative fabric, textile, sheet or mat.

Alternatively or in addition at least some of the curative fibre components are non-woven and may be randomly arranged, such as in the form of a random or chopped strand mat.

The curative fibre material may comprise a layer in which some or all of the curative fibre components are woven, stitched, continuous, discontinuous, unidirectional or randomly configured.

Preferably the curative fibre material comprises curative fibre components as described hereinabove.

Preferably the curative fibre component(s) comprise(s) part of a resin system according to a further aspect of the present invention, which system further comprises a curable resin to be cured by the curative.

The curable resin may be introduced to the curative fibre component at or just before the onset of cure, perhaps using resin infusion techniques or similar.

Alternatively or in addition the curative fibre component may be associated with the curable resin in a form where cure of the curable resin is not promoted. For instance the curable resin may be solid, such as in particulate or fibre form, or in other highly viscous form, to preferably reduce contact and interaction with the curative fibre component such that curative interaction between them is relatively slow or substantially avoided under suitable storage conditions such as refrigeration and freezing.

Alternatively, or in addition, the curative fibre component may comprise only a part of an overall curative system needed to cure the curable resin, as discussed above.

The curable resin may comprise a thermoset resin.

According to a further aspect of the present invention there is provided a composite material comprising a curative fibre component and a reinforcing fibre component.

The curative fibre component is preferably as described above. The outside diameters of the respective fibre(s) in the curative fibre component and the reinforcing fibre component may be substantially the same, preferably between 5 and 7 micron for carbon reinforcing fibre components and 15 to 20 micron for glass reinforcing fibre components.

The reinforcing fibre component may comprise one or more of carbon, glass, aramid, ceramic. The ratio of curative fibre component to reinforcing fibre component may be in the range 50:50 to 5:95 v/v and most preferably 30:70 to 10:90 v/v.

The curative fibre component may be as described above.

The reinforcing fibre component may be as described above.

The curable resin component may comprise a resin as described above.

The curative fibre component may comprise part of a composite system, which system according to the present invention comprises a composite material as described in the preceding six paragraphs and a curable resin component. The curative fibre component may be positioned away from contact with the curable resin component until it is desired that the curable resin is cured.

The curable resin component may be a solid, such as a fibre or a particulate, in which case there may be contact between some or all of the curable resin and the curative fibre component, but their physical nature, chemical nature, composition and/or the storage conditions are preferably such that the curative interaction between them is relatively slow or substantially prevented.

The curative fibre component may be as described in any of the preceding paragraphs.

The composite system may further comprise one or more other additives, such as thermoplastic, rubber.

The fibre or some or all of the reinforcing fibres in the reinforcing fibre component may be woven, stitched, continuous, discontinuous, unidirectionally or randomly orientated, chopped, twisted, intertwined or indeed in any suitable conformation for the production of composite articles.

The curative fibre component may be commingled, such as by being woven, stitched, twisted and/or intertwined with one or both of the aforesaid reinforcing fibre components and curable resin component. One or more curative fibre components may be twisted around and along the length of one or more reinforcing fibres and/or curable resin component and/or visa versa. Alternatively or in addition the curative fibre component and the reinforcing fibre component and/or curable resin component may run alongside each other in generally parallel configuration.

Alternatively or in addition the composite material or system may comprise a layer of curative fibre components and a layer of reinforcing fibres and/or curable resin component located on at least one respective surface. Each layer of fibres may be woven, stitched, continuous or discontinuous, unidirectional or randomly configured, and may be in the form of a sheet, textile or mat.

The curative fibre component may be woven, stitched, or otherwise threaded into the reinforcing fibre component and/or curable resin component, either to be generally evenly distributed within, and possibly throughout the reinforcing component and/or curable resin component, or at one or more predetermined and selected regions thereof.

Alternatively, or in addition, the reinforcing fibre component and/or curable resin component may be woven, stitched or otherwise threaded into the curative fibre component, either to be generally evenly distributed within and preferably throughout the curative fibre component or at one or more predetermined and selected regions within the curative fibre component.

According to a still further aspect of the present invention, there is provided a composite material comprising a curative fibre component, a reinforcing fibre component and a curable resin component.

The components are preferably as described above.

According to a further aspect of the invention there is provided a composite material comprising a curative fibre component and a further non-reinforcing fibre component.

The curative fibre component is preferably as described above.

The non-reinforcing fibre component may comprise a thermoplastic fibre component, which in turn may comprise one or a plurality of thermoplastic fibres.

The thermoplastic fibre component may comprise one or more of a thermoplastic polymer such as polyethylene, polypropylene, polyamide, polyether-ether-ketone, polyethylene terephthalate, polyethersulphone, polyetherimide, polyarylsulphone, polyphenylene sulphide, polyimide, polysiloxane and various types of rubbers. The or at least some of the thermoplastic fibres may be semi-crystalline.

Preferably the thermoplastic fibre component acts to toughen the composite material particularly when cured.

Alternatively, or in addition, the non-reinforcing fibre component may comprise a curable resin fibre component. The curable resin fibre component preferably comprises a curable thermoset resin. The curable resin fibre component comprises at least one thermoset resin fibre, and desirably a plurality of such fibres that are preferably generally unidirectional. The fibres within the curable resin fibre component may be generally mutually parallel, twisted or otherwise commingled with each other.

The or at least some of the fibre(s) within the curable resin fibre component are continuous. Alternatively, or in addition, the or at least some of the fibres in the curable resin fibre component are discontinuous.

The curable resin fibre component may comprise one or more of an epoxy resin, cynate ester resin, BMI (bismaleimides), polybenzoxazine, polyimide, phenolic resin and polyester. The or at least some of the fibres within the curable resin fibre component comprise a blend of a number of thermoset resins.

The curable resin fibre component may comprise a plurality of different fibres comprising different thermoset resins and/or blends thereof. Preferably the viscosity of the curable resin fibre component is greater than $5 \times 10^4$ Pas at a temperature of 23° C. and desirably greater than $2 \times 10^5$ Pas at 23° C.

The curable resin fibre component may comprise N,N,N,N-tetraglycidil-4,'4-diaminodiphenylmethane and polyethersulphone.

The curable resin fibre component may comprise a curable thermoset resin fibre component as disclosed in International patent publication WO 2009/013458A2 and the disclosure therein is incorporated herein by reference.

Preferably the ratio of curative fibre component to non-reinforcing fibre component is in the range 90:10 to 70:30 v/v and most preferably 80:20 v/v.

The curative fibre component and the non-reinforcing fibre component may be commingled together to form a composite material in manner as described in any of the paragraphs above.

According to the present invention, there is provided a composite material comprising a curative fibre component and one or more of a curable resin component, a reinforcing fibre component and a non-reinforcing fibre component.

Preferably the curative fibre component is as described above.

Preferably the curable resin component is as described above.

Preferably the non-reinforcing fibre component is as described above, and may comprise a curable resin as described above.

Preferably the reinforcing fibre component is as described above.

Preferably the fibre components are commingled, such as by weaving, twisting, stitching, intertwining, threading or any other suitable way, and may together form a sheet, tape or other preform. The respective fibre components in the material may be substantially uniformly distributed within and desirably throughout the composite material. Alternatively or in addition the location and amount of the respective fibre components may be selected and predetermined to provide materials and cured articles made therefrom with desired characteristics, such as regions of relatively high resin toughness, region of relatively high and/or low Vf.

Two of the three types of fibres may be commingled together in one way, for example twisted together, and then those two commingled with the third and/or a fourth type of fibre component either in the same way or in a different way, such as woven, threaded, stitched.

According to a further aspect to the present invention there is provided a method of manufacturing a composite article comprising introducing a curable resin and a curative fibre component.

The curable resin used may comprise a curable resin component or a curable resin fibre component as described above.

The curative fibre component used may be as described above.

The curative fibre component used may comprise part of a composite material as described above.

The curable resin may be introduced in the form of a liquid or semi-liquid and may be introduced under liquid resin infusion or similar such conditions and techniques, which may include elevated temperatures and elevated pressure or vacuum conditions.

Preferably the curable resin completely or substantially completely wets the curative fibre component and/or fully impregnates the composite material upon cure.

The method may involve subjecting the curable resin, curative fibre component and/or composite material to cure conditions.

According to a further aspect of the present invention there is provided a method of manufacturing a composite article comprising subjecting a composite material or composite system as described above to cure conditions.

According to a further aspect of the present invention there is provided a composite article manufactured using a curative fibre component to cure a curable resin.

Embodiments of the present invention will now be described by way of example only, with reference to the accompanying drawings, in which:

FIG. 1b is a diagrammatic cross-section of the curative fibre component of FIG. 1a;

FIG. 14 is a diagrammatic illustration of an alternative method of manufacture of composite material in accordance with the present invention;

FIG. 15 is a diagrammatic representation of a multi-layered composite material or perform according to the present invention, located in mould apparatus for cure;

The present invention relates to curative fibre components, composite materials and systems comprising curative fibre components, composite articles manufactured using such composite materials and methodologies for manufacturing same.

Figure 1A:
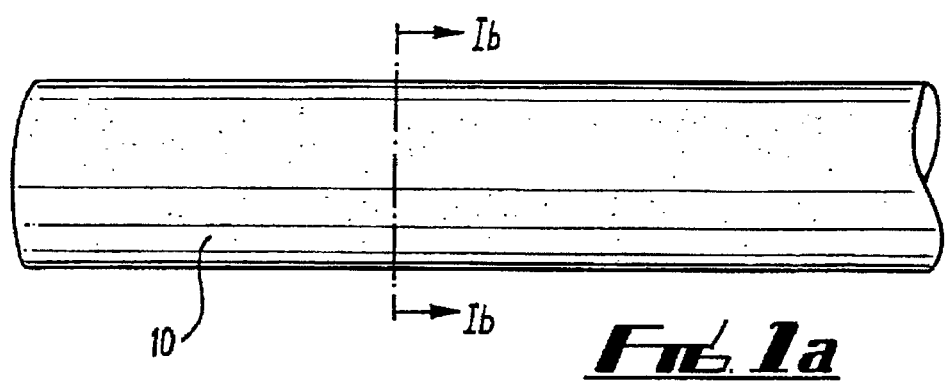
FIG. 1a is a diagrammatic representation of a curative fibre component according to the present invention.

FIG. 1a is a diagrammatic representation of a part of a curative fibre component 10 for use in curing curable resin, in particular thermoset resin.

The curative fibre component 10 is elongate and comprises in one aspect of the invention a single fibre or filament of curative. The diameter range of the fibre or filament is between 1 and 200 micron although fibres with diameters in the range 10 to 100 micron are most likely to find useful application. Fibres with diameters within the range of 10 micron to 50 micron are the most preferred.

Alternatively, the curative fibre component 10 comprises a plurality of fibres commingled together to form a thread or yarn. The dimensions of the fibre component 10 can be engineered to be suitable for the manufacture of a desired composite material. Up to 50,000 or even more fibres can be used to form a fibre component 10, depending to some extent upon the diameter of the individual fibres used (which may all be approximately the same or may be selected in different sizes), the desired overall dimension, and the characteristics of the component 10.

The curative fibre components of the present invention can be continuous or discontinuous and the type can be chosen by a person skilled in the art according to the desired properties of the curative fibre component and/or materials and articles made therefrom. For discontinuous fibre components, the lengths of the fibres therein can be provided as desired and may for example have lengths of between 20 mm and 100 mm.

Figure 1B:

FIG. 1b illustrates a cross-section of such a multi-fibre curative fibre component 10 in the direction Ib of FIG. 1a. The fibres may be commingled by twisting them together for instance, or by any other suitable method to form a fibre thread or yarn. The properties and characteristics of the curative(s) used are chosen according to, for example, the resin to be cured thereby, the materials the curative is to form, the physical state of the materials, etc. The or one or more of the fibres within the curative fibre component 10 may be a blend of curatives (cure agents). Alternatively, or in addition different fibres within the curative fibre component 10 may comprise different curatives, so that for example a component may comprise two different types of fibres each made up of one or a blend of curatives to have a combination that differs from the other. In a still further alternative, the curative fibre component 10 may comprise two or more types of fibres that differ in their respective compositions in that they each comprise a blend of the same curatives but the curatives within each fibre are present in different amounts. The nature of any additives in the component 10 may be the same or differ between the different types of fibre therein.

In a further embodiment, the curative in the curative fibre component 10 comprises only a part of the overall curative system needed to cure the intended curable resin. Different curative systems can be formulated to cure curable resins. The nature of the curable resin itself and/or other factors such as cure conditions and the characteristics of the products formed therewith, are taken into account by those skilled in the art when formulating curative systems. Many curative systems comprise a number of different parts or constituents, some of which can be more active than others at particular stages of cure. Some constituents may be relatively active in promoting cure at early stages of cure, and others more active at later stages.

Certain embodiments therefore provide for the curative fibre component to comprise only those parts of a curative system that are relatively active at early stage cure. The temperature at which such cure agents are stored can affect the degree of activity.

Such embodiments could find application for example where the curative fibre component is used to form a composite material as discussed herein, which is devoid or substantially devoid of resin with which by the curative fibre component can significantly react under storage conditions. For instance, composite materials comprising fibre reinforcement combined with curative fibres is a clear example of such a material where the present embodiment would find application. The advantage of having the relatively active part or parts of the curative system comprised in such a material, is that the remaining relatively inactive parts of the curative system can be introduced to the material along with the resin to be cured, for example liquid resin to be introduced according to resin infusion techniques without any significant interaction until the resin experiences the curative fibre component. The relative inactivity of the part of the curative system can be premixed with the liquid resin and still provide a relatively stable resin that will experience limited or no cure by the part mixed therewith, thus providing relatively good shelf life properties.

Another example of material where curative in the curative fibre component comprises the relatively active part of a curative system is one in which the curative fibre component is provided within the material at a location distanced from the curable resin in or on the material. In a further example, the material may comprise solid or substantially solid curable resin with which the curable component is in contact. Such contact would generally be limited and thus the interaction between the curative and the resin also limited.

Even in embodiments where the curative fibre component is embedded in liquid or resinous curable resin, such as where the material is fully loaded with impregnated curable resin, the physical state of the fibre component means that there will still be relatively limited interaction under storage conditions between the curative and the curable resin when compared to conventional prepregs, such that again the material would enjoy good storage characteristics.

In alternative embodiments, the curative fibre component comprises one or more of those parts of a curative system that are relatively inactive in promoting cure at early stage cure. This can be advantageous to ensure that the curative fibre component will have sufficient time to melt and disperse thoroughly throughout the composite material during the cure cycle. Some such embodiments may find application in the production of materials, such as prepregs, where curable resin in the material is exposed to the curative fibre component. The fact that the curative in the fibre component is relatively inactive at storage conditions prevents or limits cure and/or the onset of cure, until the other more active early stage cure parts of the curative system are introduced during the cure process. Also, the fibrous form itself limits interaction thus further contributing to good storage characteristics. Providing curative fibre components comprising relatively inactive early stage cure part or parts of the curative system, may find application in the manufacture of composite materials pre-impregnated with liquid or resinous resin to be cured to form the product, perhaps particularly where the material is pre-impregnated with only some of the total amount of curable resin required for cure. Such materials would have good storage characteristics and the more active parts of the curative would be introduced into the material along with the balance of the curable when impregnated into the material.

Selecting the part or parts of the curative system to be comprised in the curative fibre component of such composite materials enables the cure characteristics, particularly at storage conditions, to be engineered to provide the product with relative stability and thus relatively long shelf life.

The present invention enables the person skilled in the art to formulate curative systems and to incorporate part or all of these in the form of fibres into the curative fibre components of the present invention. It will be appreciated that sophisticated cure systems can be engineered particularly in those embodiments where the curable fibre component comprises a plurality of fibres. For example, different fibres within the component may comprise different parts of a curative system and the relative positions of those parts within the component can be such as to provide the material with the desired cure and storage characteristics. In one example, the fibre(s) comprising relatively active part(s) of the curative system could be buried within the component beneath other fibres of relatively inactive part(s) at storage conditions, thus being kept out of contact from any surrounding curable resin in the material.

Suitable curatives include one or more of dicyanimide, 4,4'-diaminodiphenylsulphone, 3,3'-diaminodiphenylsulphone, 4,4'-methylenebis(2,6'-diethylaniline), 4,4'methylenebis(2-isopropyl-6-methylaniline), 3,5'-diethyetoluene-2,4/2,6-diamine, 4,4-diaminodiphenylmethane, 1,3- diaminobenzene, 1,4-diaminobezene, N,N'-(methyl-1,3-phenylene)bis[N,N'-dimethylurea], 1-(2-cyanoethyl)-2-ethyl-4-methylimidazole, 1-(2-cyanoethyl-2-methylimidazole, 2-ethyl-4-methylimidazole, 1-methylimidazole, other imidazole derivatives, boron trifluoride complexes, boron tricholride complexes, bisphenol A, bisphenal F, thiodiphenol, phthalic anhydride, maleic anhydride, nadic anhydride, methylnadic anhydride, tetrahydrophthalic anhydride, hexahydrophthalic anhydride, methyltetrahydrophthalic anhydride, methylhexahydrophthalic anhydride, succinic anhydride, nonecenylsuccinic anhydride and dodecenylsuccinic anhydride. The or at least one of the fibres in the fibre component may comprise a blend of a number of curatives and/or the component may comprise a plurality of different fibres comprising different curatives and/or blends thereof.

Additives that enable or facilitate fibre formation may be provided. These may include thermoplastic, rubber, nano-particles, including carbon nano-tubes.

Curative fibre components of the present invention are suitable to cure thermoset resins such as epoxy resins, cyanate ester resins, BMI's (bismaleimides), benzoxazines, polybenzoxazines, polyimides, phenolic resins, polyesters and others known to those skilled in the art.

The curative fibre component 10 may comprise additives, such as thermoplastic polymer that may be provided to enhance the toughness characteristics of composite articles made therefrom. The type and amount of thermoplastic can differ between different types of fibres within the component. Other additives may be provided to give the fibre component 10 and/or the materials/products produced therewith certain desired characteristics, such as catalyst, hardener and/or accelerator.

Figure 1C:
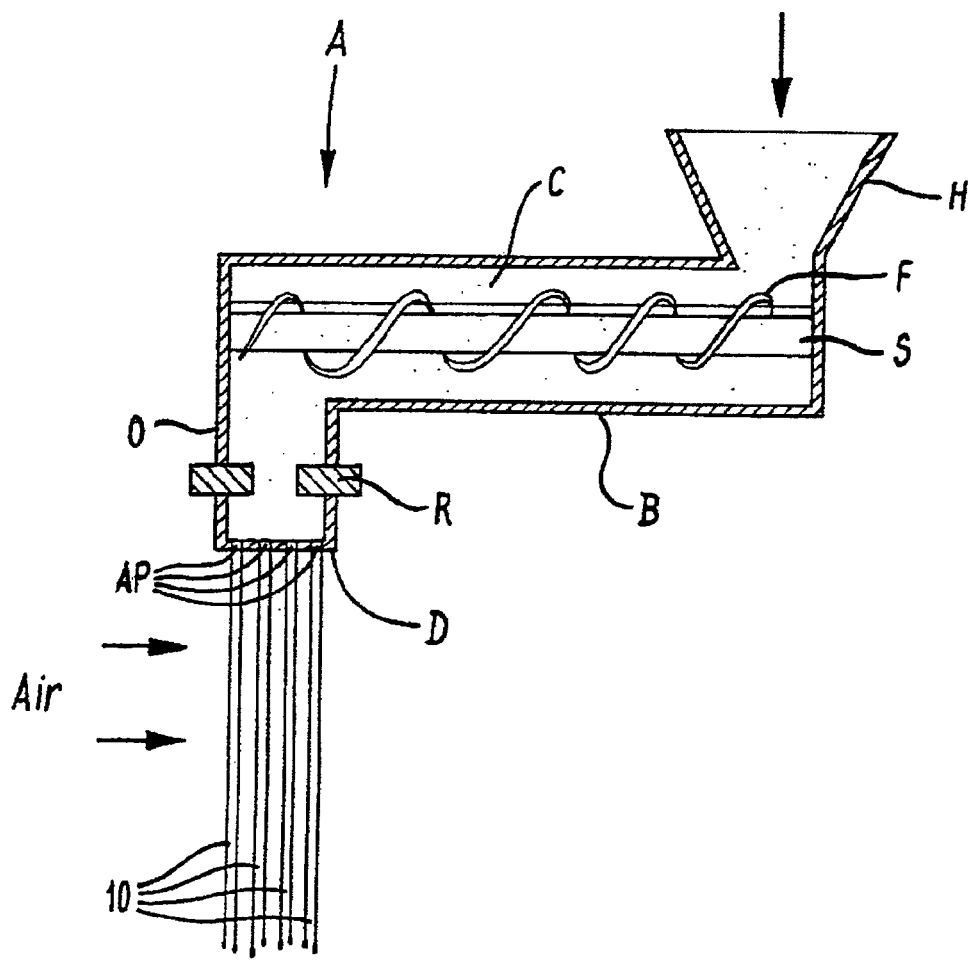
FIG. 1c is a diagrammatic cross-sectional representation of apparatus suitable for the production of the curative fibre components of the present invention.

FIG. 1c shows a simple apparatus A suitable for producing curative fibre components 10 in accordance with the present invention. The apparatus comprises a body B defining a chamber C through which extends a rotational shaft S bearing a screw formation F. The shaft S is supported at each end and is driven by drive means (not shown) for rotational movement about its axis. At an upper side of one end of the body B is a loading hopper H through which curative material can be loaded into the chamber C of the apparatus A. At the other end of the apparatus the chamber C opens downwardly into an outlet formation O. A restricting collar R extends partway across the outlet formation O to act to restrict the inside diameter of the outlet formation O towards an outlet thereof. The restriction collar R is generally annular.

A die D is located across the outlet O. The die D comprises a desired number and size of apertures AP through which curative material will be extruded to form the fibres as will now be explained.

Curative material is loaded into the hopper H. The curative material can be loaded in liquid or solid form. If it is loaded in liquid form, then the temperature in the chamber C is set to maintain the liquidity of the material at the desired viscosity. If the curative material is loaded in solid form, then the temperature within the chamber C is set to cause the curative material to melt to the desired viscosity.

The temperature across the length of the chamber C is controlled and may vary at different points along the length, to ensure that the viscosity of the curative material is at the desired value at the outlet O to provide appropriate extrusion of the material through the die D. As the material is loaded into the hopper H, the shaft S is rotated so that the screw formations F drive movement of the curative material away from the hopper towards the outlet O. As the material is loaded, the pressure of the curative material within the apparatus A, and particularly in the outlet formation, builds. As the material is driven into the outlet formation O and through the restriction collar R, the pressure is further increased to a level to drive satisfactory extrusion of the liquid curative material through the die D.

In the diagram, four apertures AP are illustrated producing four curative fibre components 10. It will be appreciated that the number of apertures and thus curative fibres formed through the die D can be controlled as desired.

As the curative fibre components 10 emerge from the die D they are cooled by a cooling air stream and then collected in accordance with conventional techniques, such as winding on a take up wheel (not shown).

The curative fibre components 10 produced in this way comprise single fibres or strands of curative. Each fibre generally has a diameter of between 1 and 200 micron, preferably 10 and 100 micron and most preferably between 10 and 50 micron. The size of the fibres can be engineered with reference to the size and other characteristics of the component to be produced therewith and the number of fibres within a component 10, the relative diameters of the various fibres within a component, etc.

It is within the scope of the present invention for a plurality of curative fibres to be commingled, such as by twisting, to form a curative fibre component 10 comprising a number of curative fibres. Such further processing of the fibres can be done according to conventional techniques.

The curative fibre components 10 are generally non-tacky to the touch and thus readily easily manually handleable. The curative fibre components 10 generally have a viscosity greater than 50,000 Pa·s and more preferable greater than 200,000 Pa·s, at temperatures of about 23° C. During cure, the viscosity drops below 20,000 Pa·s facilitating cure of the surrounding thermoset resin, as will be discussed.

Curative fibre components 10 according to the present invention will find application in many technologies and industries and of particular interest is the use of such fibres 10 in the manufacture of curable composite materials and composite articles made therefrom.

Figure 1D:
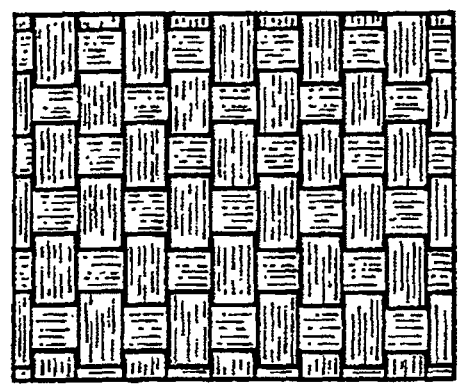
FIG. 1d is a diagrammatic plan view of a curative fibre material according to the present invention.
Figure 1E:
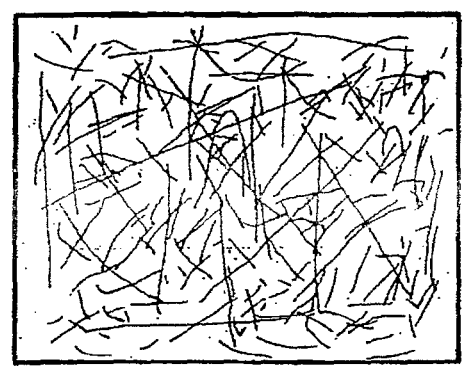
FIG. 1e is a diagrammatic plan view of an alternative curative fibre material according to the present invention.

FIG. 1d and FIG. 1e diagrammatically show two forms of fibrous material formed entirely or predominantly from curative fibre components. FIG. 1d shows a woven curative fibre material 11 in the form of a fabric, sheet, textile or mat. Curative fibre components as described above are woven, preferably using conventional techniques employed in the manufacture of fibrous reinforcements for composites to form fabric, etc.

FIG. 1e shows an alternative, non-woven curative fibre material 13 in the form of a fabric, sheet, textile or mat. The material is in the form of a random or chopped strand layer or sheet and is preferably formed using conventional techniques used in the manufacture of random or chopped mat fibre reinforcement materials.

The curative fibre materials 11, 13 can be layered or plyed along with prepregs, curable resin, fibrous reinforcements, further curative and suchlike, during the moulding process such as, for example, in a resin infusion moulding process, for use in the formation of composite products.

Alternatively or in addition the curative fibre materials 11, 13 can be comprised as a layer or ply within a multilayer prepreg or laminate, with the other layer or layers in the laminate comprising prepregs, fibrous reinforcement, curable resin, further curative and suchlike.

Having the curative as a discrete layer or ply, even adjacent to a layer of curable resin, helps with providing the prepreg or laminate with relative stability and a good shelf life.

These materials are found to have good handling characteristics, generally being non-tacky to the touch, and have relatively good stability and shelf life.

Figure 2:
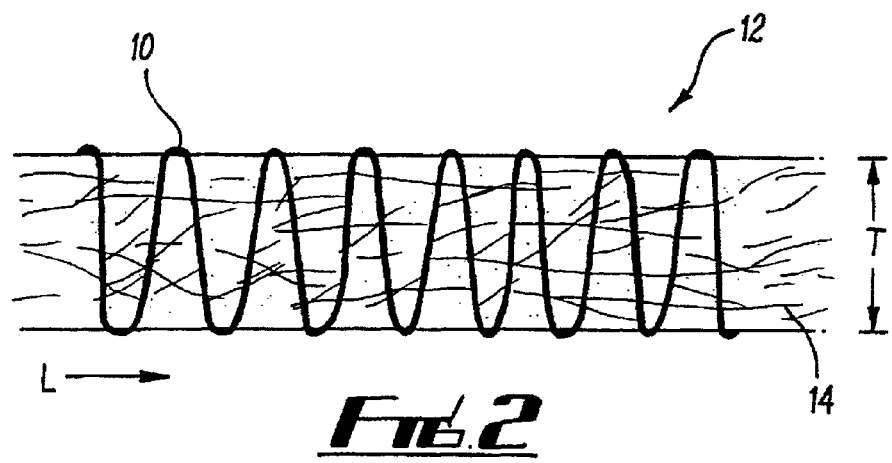
FIG. 2 is a diagrammatic lengthwise cross-section of a composite material comprising a curative fibre component and a reinforcing fibre component according to the present invention.

FIG. 2 is a diagrammatic cross-section of a composite material 12 comprising a curative fibre component 10 as described above woven into a reinforcement fibre component 14. In all of the figures the curative fibre components are shown with exaggerated diameters. This is for clarity of illustration. It is generally preferred that the diameters of the curative fibre components are the same or similar to those of other fibrous components within the composite material to facilitate fibre packing.

The reinforcing fibre component 14 may be of any known type, such as carbon, glass, aramid, ceramics or other materials known to those skilled in the art.

The reinforcing fibre component 14 may be woven, stitched, continuous, discontinuous, unidirectional, chopped, random mat or any other configuration of such materials known to those skilled in the art. The reinforcing fibre component of FIG. 2 is in the form of a layer.

Such composite materials 12 have a number of advantages.

Firstly, the material is stable with a good shelf-life at ambient storage conditions.

Second, the threading of the curative fibre component 10 through the thickness (T) of the fibre layer 14 and along its length (direction indicated at L) ensures that there is good and generally even distribution of the curative component 10 throughout the fibre layer 14. This provides for uniform combination with curable resin impregnated into the material and thus uniform cure of the curable resin.

Third, the curable resin can be introduced gradually to the curative to facilitate even and gradual cure and enables a greater degree of control and flexibility of the cure process compared to conventional techniques of combining the curative in the liquid resin before introduction to and impregnation in the fibrous reinforcement component.

Fourth, the fibrous form of the component 10 also improves air flow and evacuation characteristics, as the fibres 10 do not significantly impair the movement and thus the removal of air during cure and moreover there is considerably less risk of the curable resin becoming prematurely cured or significantly viscous to hinder complete impregnation and to trap air during the cure process. In other words, providing the curative in the form of a fibre enables the curable resin to remain liquid for longer, thus facilitating complete wetting of the fibrous reinforcement with the curable resin.

The ratio of curative fibre component to reinforcing fibre component is in the range 50:50 to 5:95 v/v and can be in the range 30:30 to 10:90 v/v.

One way to produce a cured composite article using the composite material 12 of FIG. 2 is to introduce curable resin, such as thermoset resin to the material 12 and the combination cured according to generally known techniques.

Figure 16:
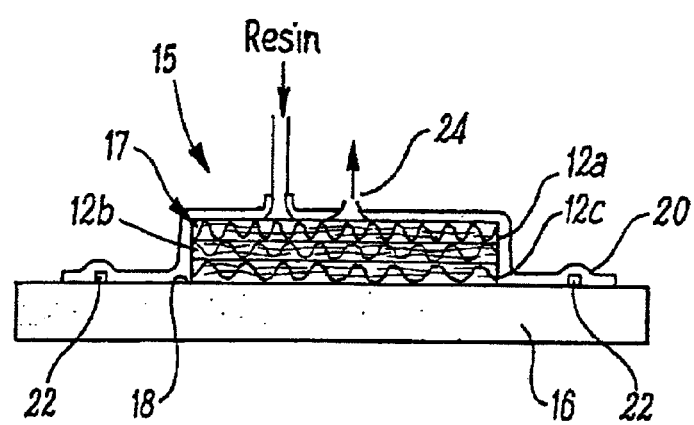
FIG. 16 is a diagrammatic representation of the present invention being used in resin fusion methodology.

FIG. 16 is a diagrammatic representation of a simple mould apparatus 15 that can be used to manufacture composite articles from composite materials according to the present invention. The apparatus 15 comprises a mould or tool 16 having a tool surface 18 on which has been laid a stack 17 comprising three layers of the composite material 12a, 12b, 12c, each corresponding to composite material 12 shown in FIG. 2. It will be appreciated however that the nature, number and orientation of composite materials of the present invention stacked can be varied and chosen by those skilled in the art according to the desired characteristics of the moulded article and generally in accordance with known techniques. Indeed, the stack can include layers of resin, dry fibre, veils, adhesives, cores, syntactic foams and any other suitable such materials and structures conventionally employed in the manufacture of cured composite articles The apparatus 15 represents a resin infusion arrangement comprising an impermeable polymeric bag 20 sealed around the outside of the stack 17 by seals 22 in conventional manner.

Once the desired composite stack 17 has been formed and seated generally beneath the membrane 20, curable resin is introduced. This can be done using conventional resin infusion technologies, such as Resin Transfer Moulding, Liquid Resin Infusion and others known to those skilled in the art.

The curable resin is ideally introduced as low viscosity liquid that rapidly wets out the stack 17. The wetted out stack 17 is then subjected to suitable cure conditions, which can involve elevated temperatures and/or vacuum conditions. In FIG. 16, an outlet 24 is shown through which air is drawn from under the membrane 20, to facilitate the removal of air and prevent void formation.

It is found that composite articles formed using composite materials of the present invention have little to no voidage. The fibrous nature of the composite materials facilitates air evacuation. Air within the structure can be drawn out past the fibres generally ahead of the movement of the thermoset resin into the stack 17 and often before there is any significant cure of the thermoset resin. The ability to thoroughly and evenly distribute the curative fibre components throughout the fibrous reinforcement, whether in the form of layers or otherwise, helps to ensure uniform cure throughout the structure, generally preventing early stage cure in particular areas of the composite, which also helps to prevent air entrapment.

Where the curative fibre components comprise only a part of the curative system needed to cure the curable resin, the other part to complete the system can be introduced with the curable resin, and may be premixed in the resin, as discussed above.

It will be appreciated that it is within the scope of the present invention for the part of the overall curative system comprised in the curative fibre component to be selected accordingly to any desirable criteria determined by those skilled in the art. For example, in systems where a plurality of parts within the system cooperate together to induce and/or promote cure, selected part or parts may be comprised in the curative fibre component to keep them away from the other part or parts until they are selectively introduced.

Also, the part or parts in the curative fibre component and that or those introduced with the resin can be selected according to their relative activity and inactivity at particular stages of the cure process, as discussed above. This provides the materials with relative stability and good shelf life.

Figure 3:
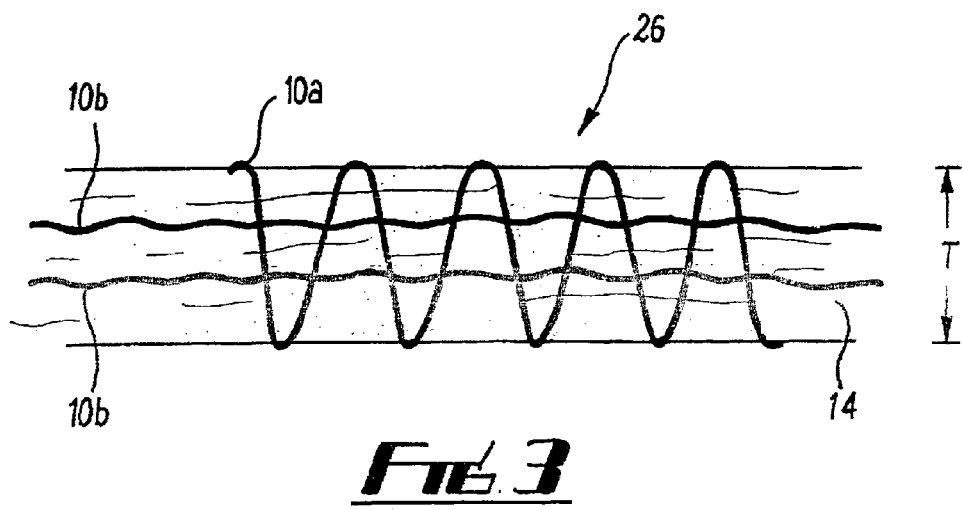
FIG. 3 is a diagrammatic lengthwise cross-section of a composite material comprising a curative fibre component and a reinforcing fibre component, according to an alternative embodiment of the present invention.

FIG. 3 is diagrammatic cross-sectional representation of a composite material 26 according to a further embodiment of the present invention. In this embodiment curative fibre component 10a, b is commingled with the reinforcing fibre component 14 in two ways. Fibre component 10a is woven or stitched through the thickness of the component 14, as in the embodiment described in relation to FIG. 2. The fibre components 10*b* are threaded or woven within the reinforcing fibre component 14, along the length thereof, but without spanning the thickness T.

This arrangement can enable more curative to be distributed within the reinforcing fibre component 14, to facilitate denser or heavier loading of the curative.

It will be appreciated that many combinations of curative fibre components can be commingled with the reinforcing fibre component 14 (and vice versa) to produce composite materials and articles made therefrom with desired properties.

Figure 4A:
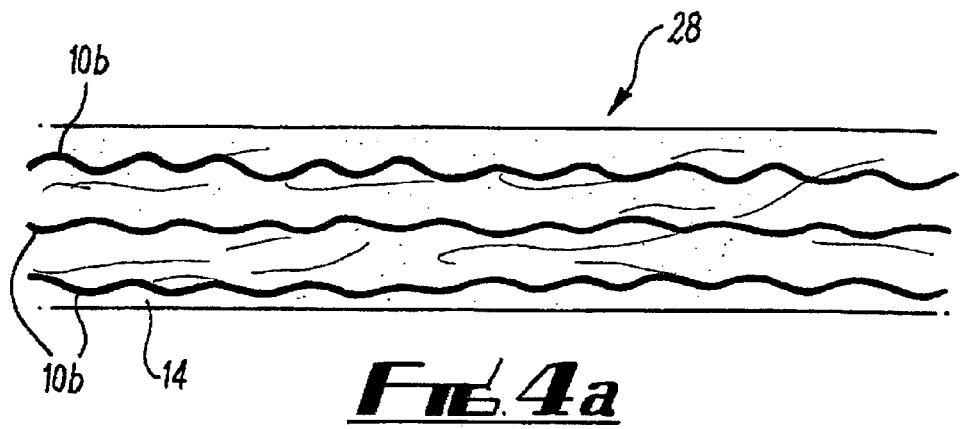
FIG. 4a is a diagrammatic lengthwise cross-section of a composite material comprising a curative fibre component and reinforcing fibre component according to a still further embodiment of the present invention.

FIG. 4*a* shows a composite material 28 according to a still further embodiment of the present invention wherein the curative fibre components 10*b* are all threaded within and along the length of the reinforcing fibre layer 14. The curative fibre components 10*b* may be the same or some or all of them may differ.

It will be appreciated that the curative fibre components can be commingled with the reinforcing fibre component using any suitable techniques including threading, weaving, stitching and the like.

It is also within the scope of the present invention for the curative fibres 10 to be located at one or more surfaces of the fibrous layer 14, either placed thereon or shallowly woven into the surface. However such configurations do not generally enjoy all the advantages described above particularly those commingled through the thickness of the fibre layer 14.

Figure 4B:
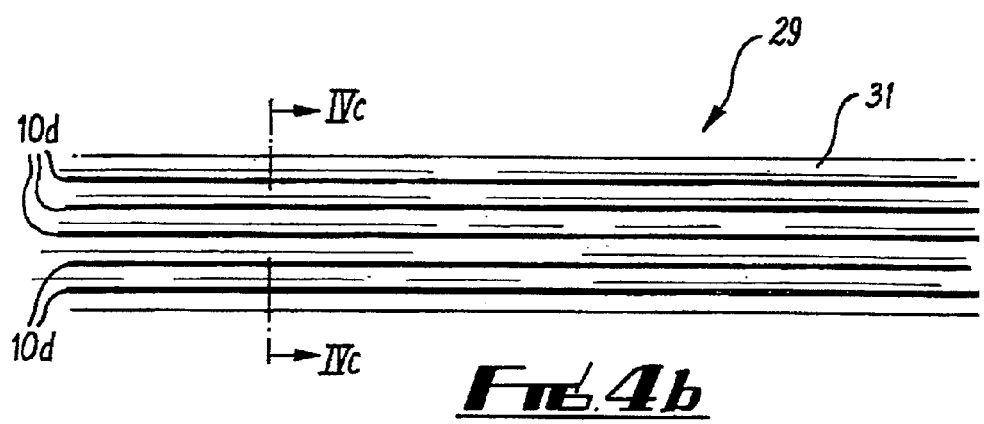
FIG. 4b is a diagrammatic lengthwise cross-section of further a composite material according to the present invention.
Figure 4C:
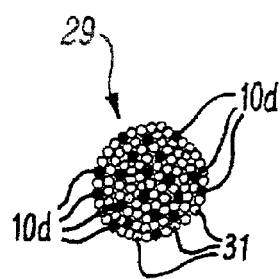
FIG. 4c is a diagrammatic width-wise cross-section of one embodiment of the composite material of FIG. 4b.
Figure 4D:
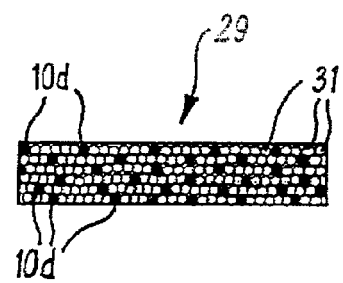
FIG. 4d is a diagrammatic width-wise cross-section of another embodiment of the composite material of FIG. 4b.

FIG. 4*b* shows a composite material 29 comprising unidirectional reinforcing fibre component 31 through which extend lengthwise generally unidirectional curative fibre components 10*d*. FIG. 4*c* is a cross-section of the material 29, showing the generally uniform distribution of the curative fibre components 10*d* throughout the material 29. FIG. 4*d* shows an alternative configuration in which the material 29 is generally in the form of a layer with the curative 10*d* and reinforcing of the components 31 generally evenly distributed therein.

Figure 5A:
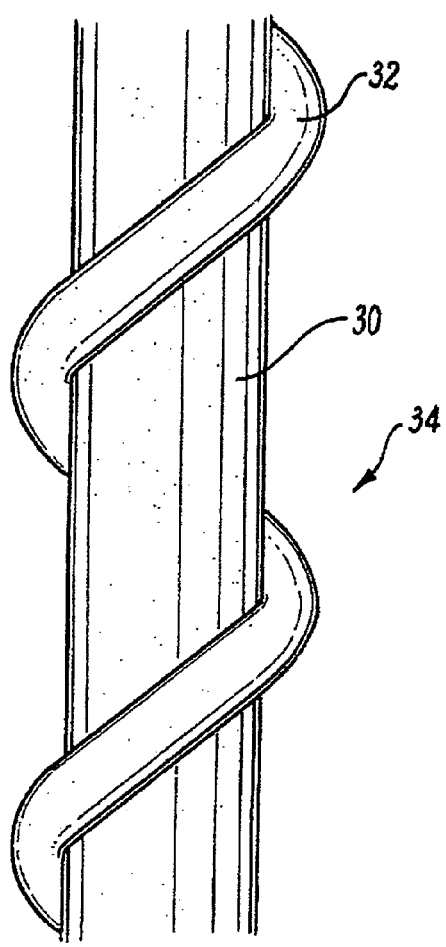
FIG. 5a is a diagrammatic representation of a composite material comprising a curable curative fibre component and a further fibre component.

FIG. 5*a* is a diagrammatic representation of a composite material 34 comprising a curative fibre component 30 around which is wound in a general helix configuration non-reinforcing fibre component 32, which in one embodiment comprises thermoplastic. Thermoplastic polymers are known to improve the toughness characteristics of thermoset resins, and the provision of a composite material 34 comprising commingled fibres of curative and thermoplastic provides a stable material that can then be used to reinforce and cure thermoset resin to produce toughened fibre-reinforced composite articles or non-fibre reinforced composite materials and articles, such as resinous adhesives.

The materials 34, which have a general fibre or thread-like conformation, can also be woven, threaded, stitched or otherwise commingled with fibre reinforcement, in particular layers of fibrous material, in a generally similar fashion as described in the embodiments above.

The thermoplastic fibre component 32 can comprise any one or a number of thermoplastic polymers, known in the art and formable into a fibrous conformation. Examples of such polymers include polyethylene, polypropylene, polyimide, polyether-ether-ketone, polyethylene terephthalate, polyethersulphone, polyetherimide, polyarylsulphone, polyphenylenesulphide, polyimide, polysiloxane and various other types of rubbers. It is generally preferred that the thermoplastic fibres are semi-crystalline.

The thermoplastic fibre components of the present invention may comprise one or more fibres of thermoplastic.

The ratio of curative fibre component to thermoplastic fibre component can be varied and determined according to the desired characteristics of the composite material and ultimately thermoset resin to be cured and toughened thereby and the composite article manufactured therefrom.

For most applications the ratio of curative fibre composite to thermoplastic fibre component 10 will be in the range 90:10 to 70:30 and most preferably about 80:20 v/v.

Figure 5B:
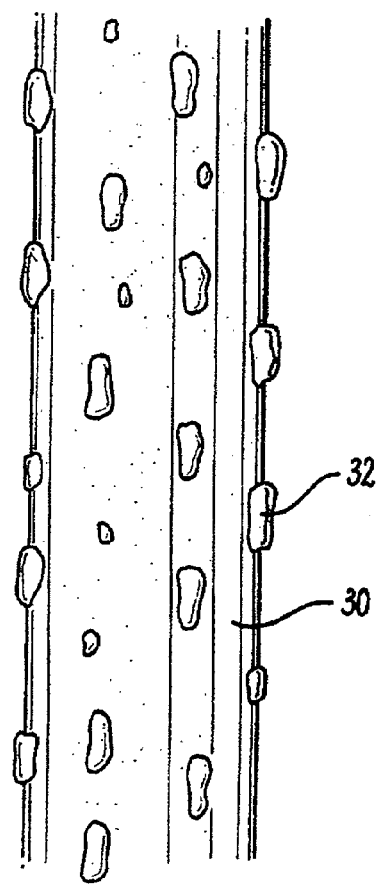
FIG. 5b is a diagrammatical representation of a further composite material comprising a curative fibre component and a further component.

The thermoplastic component 32 may be spattered onto the curative fibre component 30 as showing in FIG. 5*b*.

Figure 6:
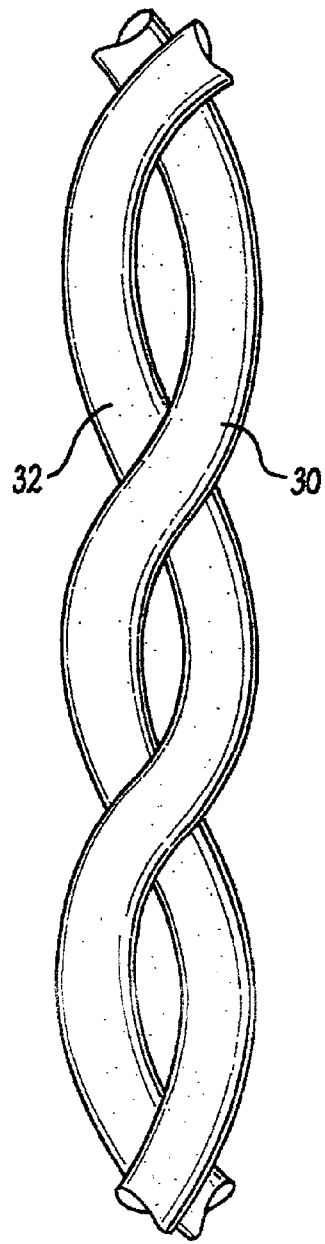
FIG. 6 is a further embodiment of a composite material comprising a curative fibre component and a further fibre component, according to the present invention.

It is also within the scope of the present invention for the curative fibre component to be wound around the thermoplastic component, and for the curative and thermoplastic fibre components 30, 32 to be mutually intertwined as shown generally in FIG. 6.

In an alternative embodiment, the non-reinforcing fibre component 32 is a curable resin fibre component. The curable resin fibre component comprises in certain embodiments a single fibre of curable thermoset resin and in alternative embodiments a plurality of curable thermoset resin fibres. In such embodiments, the curable thermoset resin fibres within the fibre component may be mutually parallel, twisted or otherwise commingled together. The or at least some of the fibres are continual in certain embodiments and in other embodiments the or at least some of the fibres are discontinuous. In further embodiments there may be a mix of continuous and discontinuous fibres.

The curable resin fibre component can comprise any suitable curable resin or curable resin system and may include one or more of an epoxy resin, cynate ester resin, BMI (bismaleimide), polybenzoxazine, polyimides, phenolic resin and polyester.

In certain embodiments the fibre or at least some of the fibres comprise a blend of a number of thermoset resins.

The curable resin fibre component may comprise a plurality of different fibres comprising different thermoset resin(s) and/or blends thereof.

In certain embodiments the viscosity of the curable resin fibre components is greater than $5 \times 10^4$ Pas at a temperature of 23° C. and preferably greater than $2 \times 10^5$ Pas at 23° C.

In certain embodiments the curable resin fibre component comprises N,N,N,N-tetraglycidil-4,'4-diaminodiphenylmethane and polyethersulphone.

The curable resin fibre components may comprise a curable thermoset resin fibre component as described in International patent publication WO2009/013458A2, and the disclosure therein is incorporated herein by reference.

In these embodiments the materials 34 or resin system, which again have a general fibre or thread like conformation can also be woven, threaded, stitched or otherwise commingled with fibre reinforcement, in particular layers of fibrous material, in a generally similar fashion as described in the embodiments above.

The ratio of curative fibre component to curable resin fibre component can be varied and determined according to the design characteristics of the composite material. The ratio may be such that there is sufficient curative to cure all of the curable resin fibre components such that in effect the composite material 34 comprises the complete resin and curative system.

In alternative embodiments the curative fibre components may be complemented with additional curative for cure of the curable resin fibre component and/or further curable resin introduced to the material 34.

The curative fibre component may be wound around the curable resin fibre component, and the curative and curable resin fibre components may be mutually intertwined as shown generally in FIG. 6.

In such embodiments the curative may be located to have no or only limited curative interaction with the curable resin. This can be achieved through the limited physical contact between the two generally solid fibre components and/or the curative being temperature sensitive and not exhibiting any appreciable curative properties beneath certain temperatures, below which the material would generally be stored.

As discussed above, the curative fibre component may comprise only a part of the complete curative system required to cure the resin. In such embodiments, the part of the curative system comprised in the curative fibre component can be selected according to for example the material to be produced thereby the cure methods the material is to be exposed to, the desired shelf life of the material etc. The said part may be relatively active or relatively inactive at early stages of cure, depending primarily upon whether the component is to be stored in contact with curable resin and to some extent the physical condition of the curable resin. In this embodiment, the curative fibre component would comprise one or more parts of a curative system that are relatively inactive, particularly at intended storage conditions, thus endowing the component 34 with a good shelf life.

Although not illustrated, it is also within the scope of the present invention for the curative to be wound around a reinforcing fibre component and/or a curable resin component of which the representation would be similar to that of FIGS. 5a and 6, with numeral 30 representing the reinforcing fibre component or curable resin fibre component and 32 the curative component.

Winding of curative fibre components around a thread or yarn of reinforcing fibre finds particular application in stretch-broken reinforcement fibres which essentially comprise carbon fibres, purposely stretched to a point where they are broken along their length. This provides particular drape and conformability advantages, but does inherently weaken the structure of the carbon fibre material. Wrapping fibres of curative of the present invention around the stretched broken reinforcement has been found to stabilise and strengthen the stretched broken yarn.

It is also within the scope of the present invention that the non-reinforcing component 32 may be a blend of thermoset resin, thermoplastic and/or other additives.

The present invention also provides composite materials comprising a curative fibre component, a non-reinforcing fibre component and a reinforcing fibre component.

Figure 7:
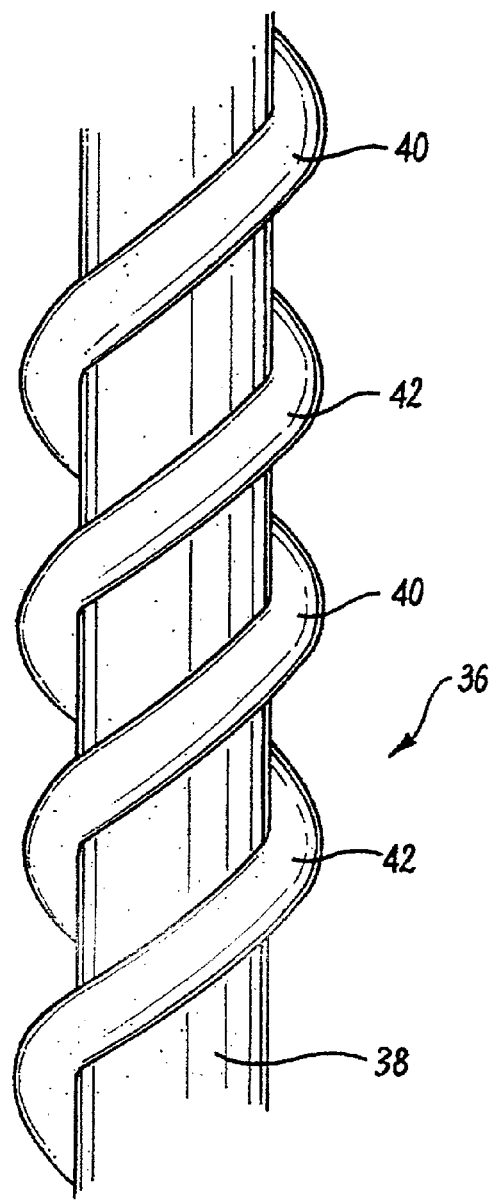
FIG. 7 is a diagrammatic representation of a composite material comprising a curative fibre component and further fibre components in accordance with an embodiment of the present invention.

FIG. 7 is a diagrammatic representation of a composite material 36 comprising a central reinforcing fibre component 38 around which is wrapped a curative fibre component 40 and in spaced relation thereto a further non-reinforcing fibre component 42 to form a double-helix-type arrangement. Such a configuration provides a stable composite material, even when the non-reinforcing fibre component comprises the curable resin, that can then be used to form composite articles and components. The material 36 provides a generally uniform distribution of both curative and the further non-reinforcing fibre component around and along the length of the reinforcing fibre component 38.

In alternative configurations the central component 38 could be the curative or further non-reinforcing fibre component with the other thereof and the reinforcing fibre component wrapped therearound in the general double-helix configuration. The further non-reinforcing fibre component may be as described above, or may comprise a second curative fibre component which may be the same as or different to the other curative fibre component 36 comprised in the method. The spaced configuration of the fibre components 40, 42 lends itself to one being the curative and the other thermoset resin, whereby the material 36 comprises all constituents for a complete prepreg, yet is stable due to the lack of interaction between the thermoset resin and the curative.

The double-helix configuration may be a generally equi-spaced configuration or the fibre components thereof could run in a closer and more stretched configuration or any other suitable configuration where the components preferably twist or wind relative to and around each other.

Figure 13:
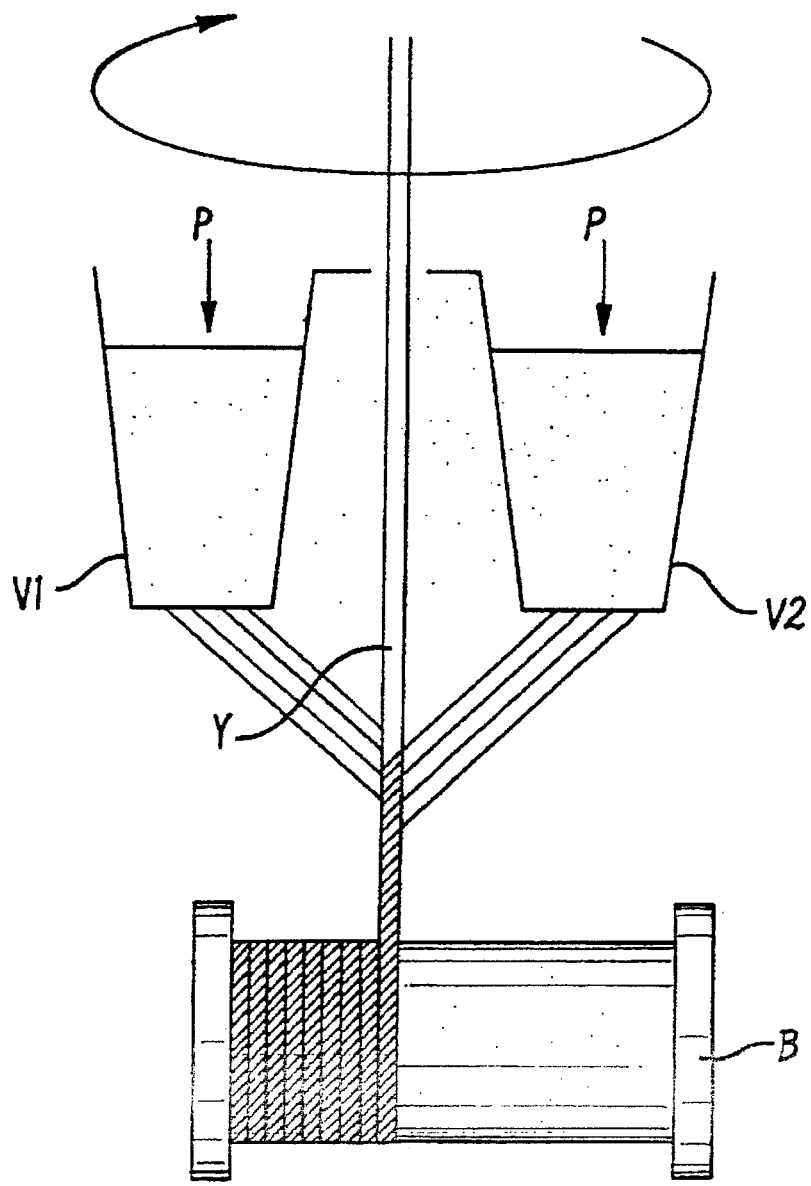
FIG. 13 is a diagrammatic illustration of a method of manufacture of composite material of the present invention.

FIG. 13 is a diagrammatic illustration of apparatus and a method of producing a composite material as described in relation to FIG. 7.

Two separate vessels or chambers within a single vessel V1, V2 are charged with liquid. For example V1 can be charged with a curative and vessel V2 can be charged with a further (which could be the same or a different composition) curative and/or thermoplastic, thermoset resin or combinations of these. The vessels V1 and V2 may be heated. Pressure is applied generally in the direction of the arrows P. In or toward the base of the vessels V1 and V2 are apertures which may be in the form of holes or slits (not shown) though which the liquid material is forced. Between the vessels V1 and V2 extends centrally a fibre or yarn of reinforcing fibre Y, which extends from a source of that material (not shown) to a take up wheel or bobbin B. The vessels V1 and V2 rotate around the reinforcing fibre Y, resulting in the threads or fibres emerging from the respective vessels V1 and V2 being wound around the yarn Y. The relative speed of rotation of the vessels V1 and V2 and the speed of take up of the fibre Y on the bobbin B are coordinated so that the configuration of the fibres on the central yarn are as required.

Figure 8:
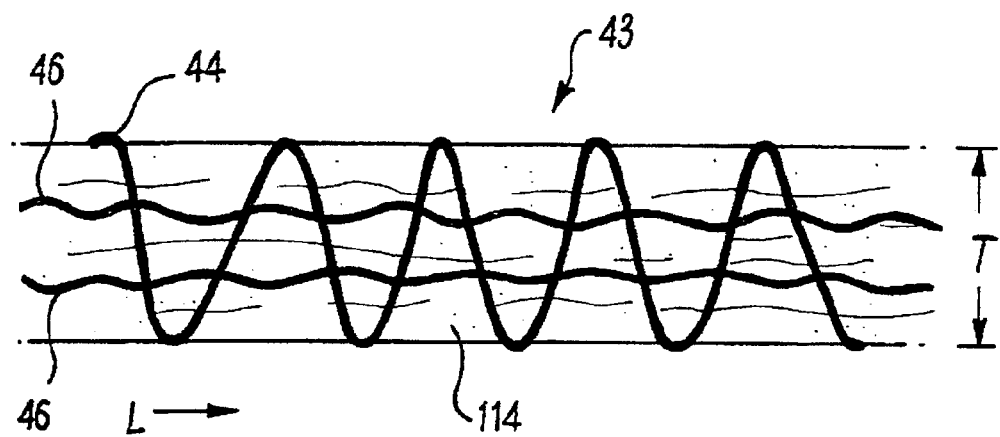
FIG. 8 is a diagrammatic lengthwise cross-section of a composite material comprising a curative fibre component, thermoplastic fibre component and a reinforcing fibre component according to a further embodiment of the present invention.

FIG. 8 illustrates a further embodiment of a composite material 43 comprising curative, thermoplastic and reinforcing fibre components. The composite material 43 comprises a layer of fibrous material 114 generally as described above. A thread of curative fibre component 44 is woven or stitched through the thickness T and along the length of the fibrous layer 114 (in direction of arrow L) and thermoplastic fibre components 46 are threaded within the layer. It will be appreciated that the curative fibres 44 and thermoplastic fibres 46 can be interchanged.

Figure 9:
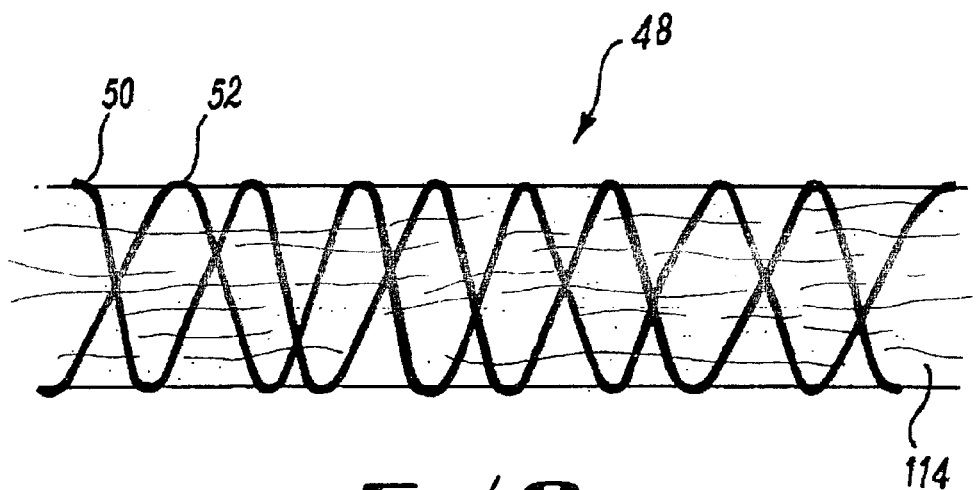
FIG. 9 is a diagrammatic cross-section of a composite material comprising a curative fibre component, thermoplastic fibre component and a reinforcing fibre component according to a still further embodiment of the present invention.

FIG. 9 shows a further composite material 48 wherein both the curative 50 and the thermoplastic 52 are woven or threaded or stitched through the thickness of the fibre layer 114, desirably in generally evenly spaced configurations.

The thermoplastic fibre components 46 may be replaced with curable resin fibre components.

In all of these configurations, the air evacuation properties are good and it is shown that during cure the curable resin introduced thereto uniformly cures within and throughout the fibrous layer 114 to provide an essentially void-free, homogenous and uniformly toughened cured composite article.

Figure 10:
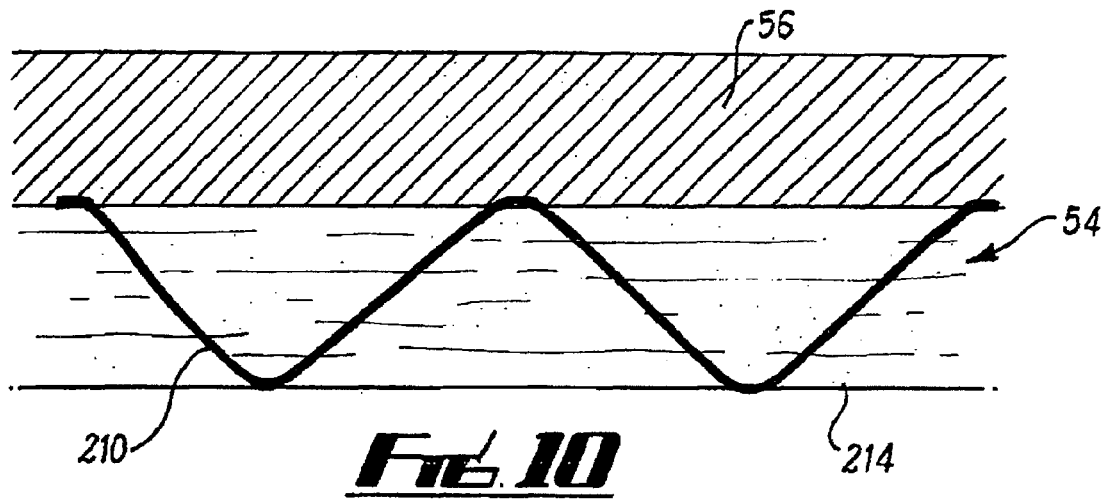
FIG. 10 is a diagrammatic lengthwise cross-section of a composite material according to a further embodiment of the present invention.

FIG. 10 is the diagrammatic cross-section of a composite material 54 comprising a reinforcing fibre component 214 through which is threaded a curative fibre component 210 and on one side of the material 54 is a layer 56 of additional material, which may comprise a layer of curable thermoset resin either tacked onto the surface of the reinforcing fibre component 214 or partially impregnated therein.

The layer 56 in this embodiment comprises the thermoset resin that will impregnate and "wet-out" the reinforcing fibre component 214 during the cure process.

Layer 56 comprises the correct amount of thermoset resin to fully wet-out and impregnate the fibrous component 214 during and following cure. The composite material 54 is in the form of a prepreg. In a further embodiment, the layer 56 has sufficient resin to only partially wet out the fibrous component 214 and additional resin is provided from elsewhere such as by liquid infusion and/or a similar layer (not shown) beneath the fibrous component. The absence of any significant contact between the thermoset resin in the layer 56 and the curative fibre components 210 give the material 54 good stability and shelf-life properties. In the illustration in FIG. 10 a small degree of contact is shown between the curative and the thermoset resin, but if necessary this can be avoided by stitching the curative just below the surface of the fibrous layer 214.

Figure 11:
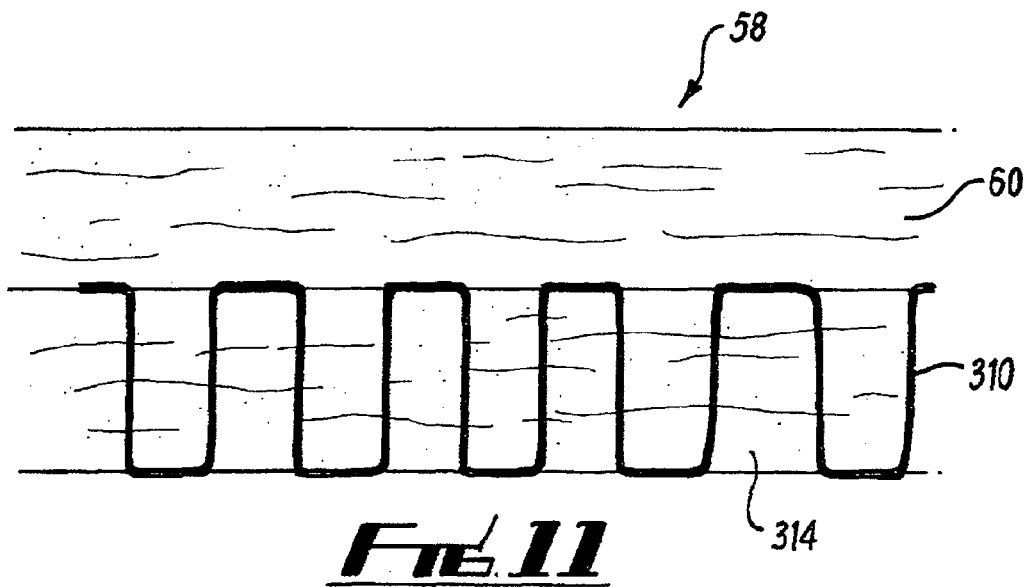
FIG. 11 is a diagrammatic lengthwise cross-section of a composite material according to a still further embodiment of the present invention.

FIG. 11 is an alternative embodiment showing composite material 58 comprising a reinforcing fibre component 314 through which is stitched in a generally castellated configuration, curative fibre component 310. On one side of the material 58 is a further layer of fibre reinforced material 60, which may comprise dry fibre or may comprise partially or fully impregnated fibre reinforced prepreg, which in turn may comprise sufficient resin to impregnate and potentially wet-out the fibrous component 314 when subjected to appropriate conditions.

Figure 12:
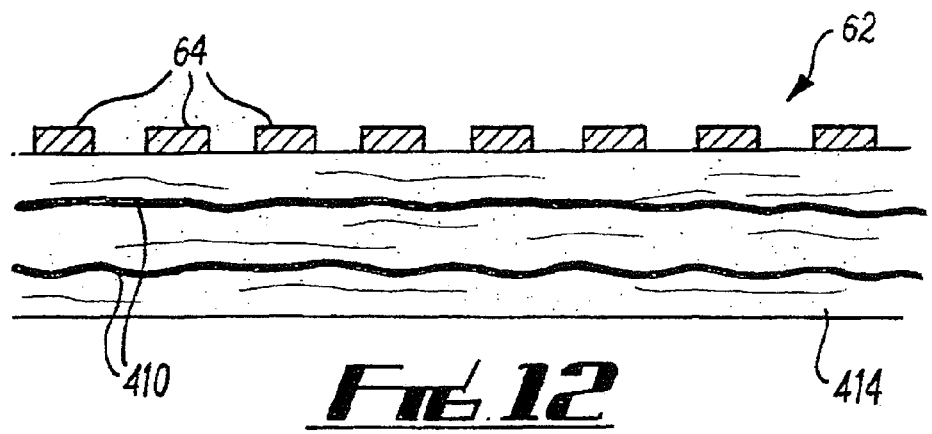
FIG. 12 is a diagrammatic lengthwise cross-section of a composite material according to another embodiment of the present invention.

FIG. 12 shows a still further embodiment comprising composite material 62 having a reinforcing fibre component 414 through which is threaded a plurality of curative fibre components 410, generally in a similar fashion to the embodiment of FIG. 4a.

On one surface of the reinforcing fibre component 414 are blobs or other more uniform patterns such as stripes, of curable resin 64. These can be provided in different amounts to impregnate and wet-out the reinforced fibre component 414 during cure. The resin blobs or patterns 64 (in similar fashion to the layer 56 of the embodiment of FIG. 10) also provides surface tack to the otherwise generally dry composite material thus facilitating placement of the composite materials for or during cure.

All of the composite materials discussed above, in relation to FIGS. 10, 11 and 12, are prepregs that can be used to manufacture fibre reinforced composite articles according to conventional cure techniques, but which enjoy the significant advantage of good stability and shelf-life properties and good wet-out and cure characteristics, resulting in generally void-free and uniformly cured composite articles.

FIG. 15 shows a simple vacuum bag mould tool 115 charged with a stack 117 of composite material, comprising a first laminate of material 54 of FIG. 10 and a second laminate 62 of FIG. 12, sealed on a tool surface 118 of a tool 116 beneath a vacuum bag 120. Seals 122 seal the bag 120 to the tool 116.

The stack 117 is subjected to conditions to cause the thermoset resin within the layers 56, 64 to liquefy and flow generally into the respective fibrous layers 214, 414 to fully impregnate and wet the fibrous components 214, 414. The application of heat facilitates liquification and movement of the resin, and in this embodiment pressure conditions are applied by the withdrawal of air from beneath the vacuum bag (see outlet 24) to facilitate resin movement, impregnation and wet-out.

The provision of the curative for the resin in the respective layers 56, 64 in the form of a fibre within the respective fibrous layers facilitates complete impregnation of the resin with the fibrous layers. The fibrous characteristics of the curative do not hinder movement of resin or air there round and moreover the thermoset resin generally remains liquid for longer because the interaction between the curative and the thermoset is delayed, relative to conventional techniques where the curative and thermoset are premixed in the resinous layer.

FIG. 14 is a diagrammatic illustration of further apparatus suitable for forming composite materials, according to the present invention. The apparatus is very similar to apparatus known in the formation of conventional prepregs. The advance is that the fibres being introduced into the composite material include curative fibre which is previously not known.

In FIG. 14, three sources as of fibre 1, 2, 3 are shown from each of which is provided fibrous materials for use in the formation of composite materials according to the present invention.

For example, source 1 may comprise a source of curative fibre component according to the present invention. Sources 2 and 3 may also comprise reinforcing fibre component, other non-reinforcing fibre components, thermoset resin fibre components, or other various combinations.

Essentially the fibre components from the respective sources 1, 2, 3 are fed around the drums D1, D2 and through the rollers R1, R2 to be packed together to form composite material which is then further processed accordingly to conventional techniques such as the application of further layers of resin, supporting substrates and so on.

The apparatus of FIG. 14 is suitable for example to form composite materials described in relation to FIG. 4a, 4b, 4c, 4d, FIG. 12. Further processing of the composite material produced by the apparatus 14 could include stitching to produce composite material as shown for example in FIG. 3 and FIG. 8.

Figure 17:
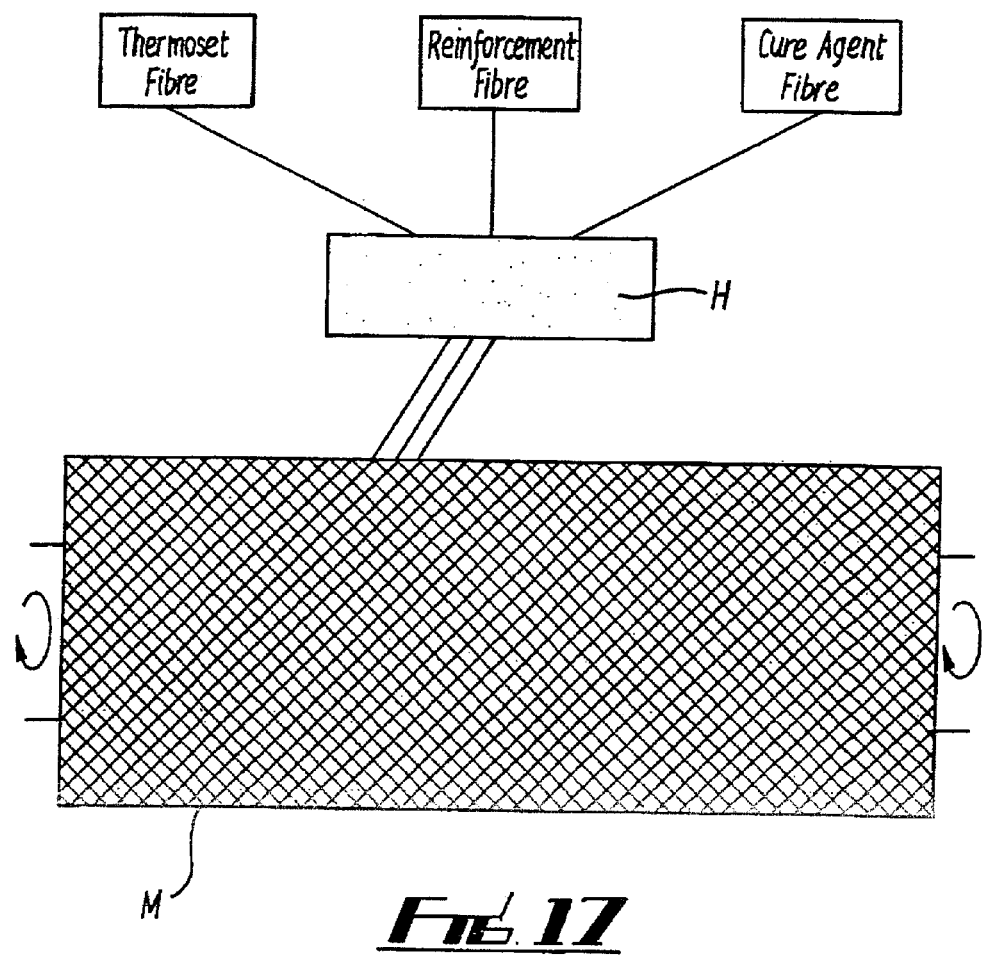
FIG. 17 is a diagrammatic representation of the present invention being used in tow placement.

The materials of the present invention can also be used in tow placement methodologies. FIG. 17 is a diagrammatic illustration of the use of curative fibre components of the present invention used in tow placement.

The apparatus is generally conventional apparatus for tow placement. However, curative (cure agent) fibre is fed to the placement head H along with reinforcement fibre and curable resin fibre. The three fibre components fed to the head H are then located onto and wound around a mandrel M which is rotated about its axis to effect winding. The head H moves up and down the length of the mandrel M to ensure even winding of the fibres.

It will be appreciated that the number and nature of fibres fed to the head can be varied according to the nature and the number of fibres to be wound on the mandrel M. For example, more than one curative component may be fed to the head H. This plurality of curative fibre components may be the same or different to one another. The number and nature of reinforcement fibres may be varied. Curable resin may not be provided in fibre form and may be applied in other ways. Further non-reinforcing fibre components may be used.

It will be apparent to those skilled in the art as to the considerable number of options and variations that can be employed using tow placement technology and the advantages of using curative fibre components in such technology, in accordance with the present invention.

Various modifications may be made without departing from the spirit or scope of the present invention.

Figure 18:
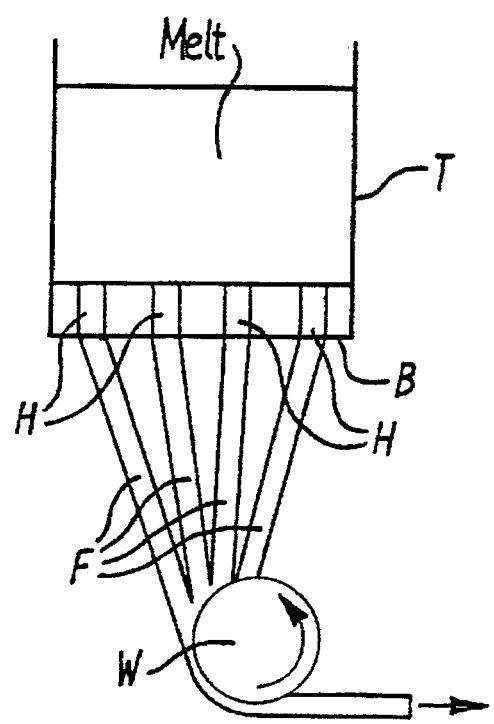
FIG. 18 is a diagrammatic representation of further apparatus suitable for the production of curative fibre components of the present invention.

FIG. 18 shows a further simple method of producing curative fibre components 10 in accordance with the present invention. Liquid curative (melt) is discharged through a die or spinneret comprised of openings H in the base B of the holding tank T. Pressure may be applied to drive the curative through the die. As the curative fibres F emerge from the base of the tank, they are generally cooled to solidify them prior to collection on a take up wheel W.

If the tank T is static then the curative fibres F will comprise a single fibre or strand of curative and each will correspond to a curative fibre component 10 of the present invention.

The fibres can be collected in a way to keep them separate, but are more likely to be subjected to further processes such as twisting, to bring individual fibres together to form a larger fibre component.

If the tank T rotates about a vertical axis, then as the fibres F emerge from the die they are twisted around each other. This twisted yarn or curative fibre component 10 is then collected on the take up wheel for onward processing.

The apparatus of FIG. 18 shows only four strands or fibres F of curative emerging therefrom. It will be appreciated however that the number of openings H may range from a single opening to thousands of openings.

This method of manufacture can produce curative fibre components of a single formulation when the tank T is charged with a single type of curative formulation.

However, the tank T may be subdivided into a number of discrete chambers, each of which can be charged with a different curative formulation. This enables curative fibre components 10 according to the present invention to be produced comprising a plurality of fibres having differing compositions and/or formulations.

It will be appreciated that in the above referenced embodiments the number of curative and non-reinforcing fibre components illustrated are particularly small. Whilst it is within the scope of the present invention for components comprising single fibres and single fibre components to be used, it will be more usually for many, perhaps hundreds or thousands of fibre components to be provided in a composite material of the present invention.

It will be further appreciated that there are very many configurations of composite materials that can be produced using curative fibre components of the present invention and that the above embodiments are only a selection chosen to illustrate the significant advantages and wide range of applications and configurations of materials that can be produced in accordance with the present invention. The scope of the present invention extends to all possible combinations of curable resin, reinforcement and/or non-reinforcement components with one or more curative fibre components according to the present invention.

For many applications of the present invention the general preference is to provide composite materials throughout or generally throughout which there is an even distribution of curative fibre component to provide for the manufacture of composite articles therefrom that exhibit uniform properties, particularly cure properties.

However, for certain applications the distribution of the different fibre components can be intentionally non-uniform and selected to form material with non-uniform distribution of components therewithin and thus enable articles to be produced with areas or regions thereof with specifically engineered properties that differ from other areas or regions thereof. The fibrous nature of the components and particularly the curative components of the present invention facilitate the production of such materials and articles.

For example, where curative and/or non-reinforcing components have been described and illustrated above with reference to the figures, as extending through the thickness T and along the length L, they could be provided to extend along only part of the length, a number of sections of the length, only partway through the thickness and so on. Also of course, such materials also generally have a width, often being generally in the form of a layer or sheet, and the components could be provided at only predetermined locations or areas across that width.

The fibrous form of the components provides for the components to be easily provided in such a selective manner. They can for example be simply stitched into reinforcing fibre at predetermined locations and/or woven or otherwise threaded into the matrix of the reinforcing fibre. Further, the components illustrated particularly with reference to FIGS. 5 and 7 could be provided at predetermined and spaced regions along the length of the central component.

Composite materials according to the present invention also find application as adhesives and other non-fibre-reinforced materials. Embodiments described hereinbefore, particularly those absent any reinforcing fibre component can find such application.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A composite material comprising reinforcing fibres combined with a curative fibre component in the form of a single solid fiber or a plurality of solid fibres, each solid fibre consisting of one or more curatives for curing a thermoset resin,
   wherein the composite material is devoid of any thermoset resin with which the curative fibre component can react, and the curative fibre component has a shelf-life of over 12 months when stored frozen and a shelf-life of over 3 months when stored at ambient temperatures of between 18° C. and 23° C, and
   wherein the reinforcement fibres are selected from: carbon fibres, glass fibres, aramid fibres, ceramic fibers and combination thereof.

2. The composite material of claim 1, wherein the curative fibre component is in the form of a plurality of solid fibers, which are woven with the reinforcement fibres.

3. The composite material of claim 1, wherein the reinforcement fibers are forming a layer and the curative fibre component is threaded or stitched through said layer of reinforcement fibres.

4. The composite material of claim 1, further comprising thermoplastic fibres.

5. The composite material of claim 4, wherein the thermoplastic fibers are formed of a thermoplastic polymer selected from the group consisting of polyethylene, polypropylene, polyamide, polyether-ether-ketone, polyethylene terephthalate, polyethersulphone, polyetherimide, polyarylsulphone, polyphenylene sulphide, polyimide, polysiloxane, and combinations thereof.

* * * * *